Patented July 3, 1934

1,964,747

UNITED STATES PATENT OFFICE 1,964,747

PROCESS OF SEPARATING METALS

Andrew T. Sweet, Houghton, and John D. MacCarthy, Detroit, Mich., assignors to General Manganese Corporation, Detroit, Mich., a corporation of Delaware No Drawing. Application July 1, 1929,
Serial No. 375,322

1 Claim. (Cl. 23—128)

The invention relates to a process for the separation of certain metals and is applicable to a wide variety of uses. The method may be used for beneficiating certain ores for the extraction of the metallic content of certain minerals or for effecting a separation between two or more metals in various and sundry substances whether they be natural products such as ores and minerals or artificial products such as slags or other by-products of chemical or metallurgical processes.

Our co-pending application, Serial No. 359,154, filed April 29, 1929 discloses certain processes using a differential sulphatizing step for the separation of manganese and iron. This application deals more specifically with a process for the separation of magnesium and iron by means of a differential sulphatizing step.

In carrying out this process the compound containing the iron and magnesium is subjected to a sulphatizing process, converting the iron and magnesium into iron sulphate and magnesium sulphate, respectively. The resulting mixture of the sulphates is then subjected to a controlled oxidizing roast maintaining the temperature at a point where the magnesium sulphate remains unchanged while the iron sulphate is decomposed and is converted into iron oxide. The mixture is then in a condition for effecting a separation by a water leach since the magnesium sulphate is dissolved in the water and the iron oxide remains undissolved in the mixture.

The sulphatizing process may be carried out in various ways, one of which is to add sulphuric acid to the solid material prior to the subjection of the material to the oxidizing roast. Another method of sulphatizing is to subject the original iron magnesium mixture to the action of sulphur trioxide gas obtained through the burning of a sulphur-bearing material or by other suitable methods. It may be found desirable in some instances to add a sulphur ore to the magnesium iron product and process both substances through a sulphatizing furnace. Whether these or other processes are used for the sulphatizing step, the result is in each instance to obtain magnesium and iron sulphates which in this form are not readily separable one from the other. The next step of the process is to subject the sulphatized material to an oxidizing roast at a predetermined temperature such that the magnesium sulphate will not be decomposed but the iron sulphate will be decomposed and converted into the oxide form. The range of temperature for carrying out the oxidizing roast is between 600° C. and 970° C. This temperature is high enough to insure complete decomposition of the iron sulphate into the insoluble form and is sufficiently under the decomposition point of the magnesium sulphate to prevent substantial loss of magnesium in the subsequent water leach. It should be noted that in the oxidizing roast the iron sulphate is converted into the oxide with the evolution of sulphur trioxide gas which may be re-introduced into the sulphatizing furnace, thereby conserving the amount of sulphur used in the process.

What we claim as our invention is:

The method of extracting magnesium from an ore containing magnesium and iron comprising the treatment of said ore with a sulphur oxide gas to convert both magnesium and iron into sulphates, roasting the sulphatized product at a temperature between 600° C. and 970° C. until the iron is rendered into a relatively insoluble form, and leaching with water forming a magnesium sulphate solution substantially free from iron.

ANDREW T. SWEET.
JOHN D. MacCARTHY.